United States Patent [19]

Urai

[11] 4,268,994
[45] May 26, 1981

[54] THREE-DIMENSIONAL PLANTER

[76] Inventor: Muneharu Urai, 3-419-3, Takagi, Higashiyamatoshi Tokyo, Japan

[21] Appl. No.: 974,561

[22] Filed: Dec. 29, 1978

[30] Foreign Application Priority Data

Dec. 27, 1977 [JP] Japan .............................. 52-175178

[51] Int. Cl.³ .............................................. A01G 9/02
[52] U.S. Cl. ........................................ 47/79; 47/67; 47/81; 47/82
[58] Field of Search ....................... 47/59–67, 47/77, 79–83, 87, 56, 39

[56] References Cited

U.S. PATENT DOCUMENTS

| | | | |
|---|---|---|---|
| 1,217,239 | 2/1917 | Swartz | 47/8 2 X |
| 2,152,869 | 4/1939 | Campbell | 47/82 |
| 3,063,196 | 11/1962 | Pauer | 47/82 |
| 3,357,129 | 12/1967 | Torrence | 47/79 |
| 3,452,475 | 7/1969 | Johnson | 47/79 |
| 3,877,172 | 4/1975 | Schwab et al. | 47/64 |
| 4,034,508 | 7/1977 | Dedolph | 47/83 X |
| 4,055,022 | 10/1977 | Rowe | 47/79 |

FOREIGN PATENT DOCUMENTS 2253451 7/1975 France ......................... 47/83

Primary Examiner—Robert E. Bagwill
Attorney, Agent, or Firm—Finnegan, Henderson, Farabow, Garrett & Dunner

[57] ABSTRACT

A three-dimensional decorative planter having a frame for securing a vertically disposed cultivation body and having a liquid reservoir and conduit for liquid from the reservoir to the cultivation body. The frame also has a trough for collecting excess liquid. The cultivation body includes culture material and filler in arrangements necessary to secure the culture material and provide watering, drainage and ventilation.

27 Claims, 19 Drawing Figures

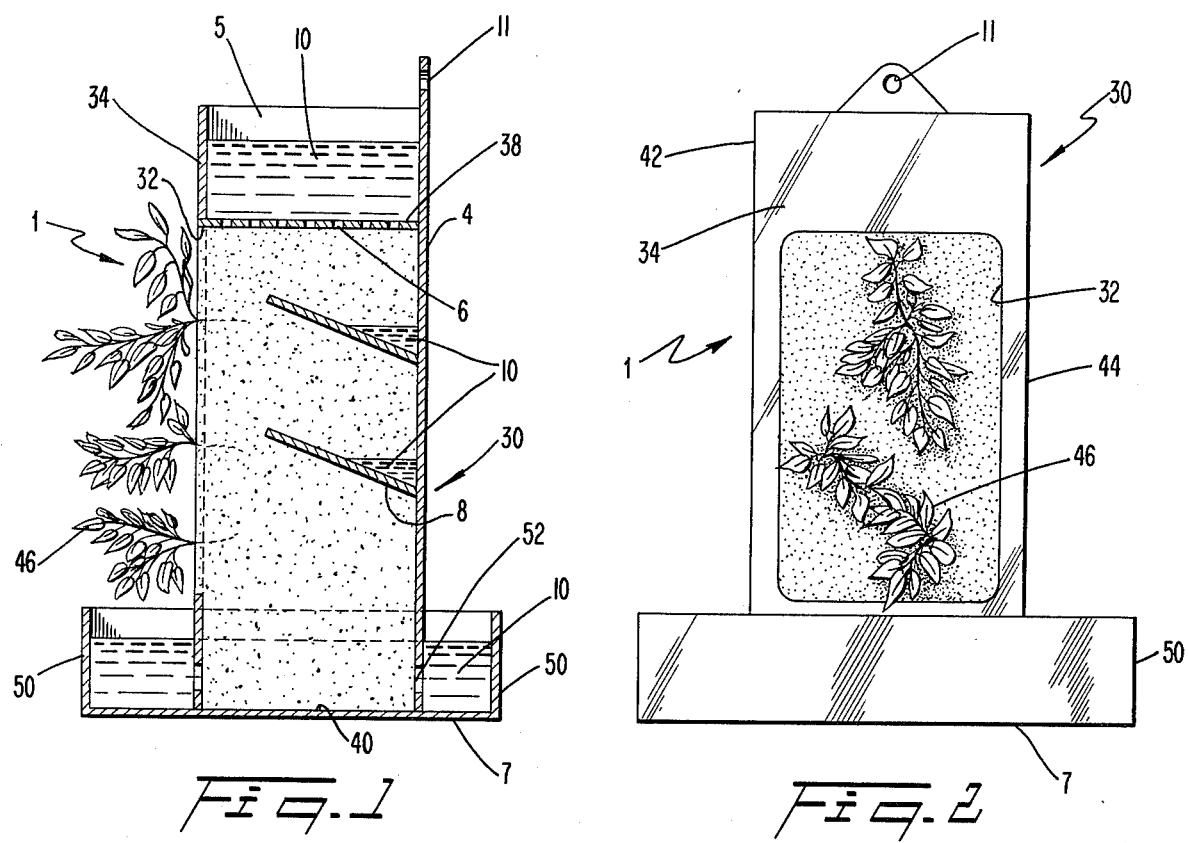
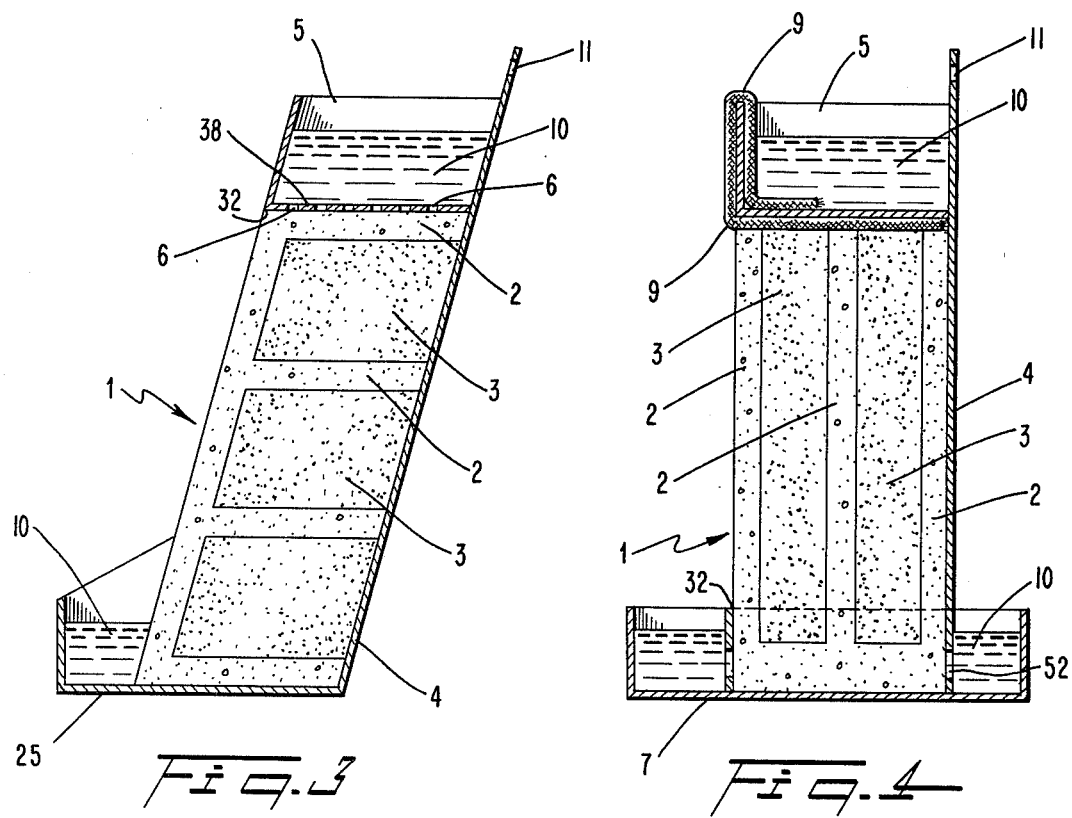

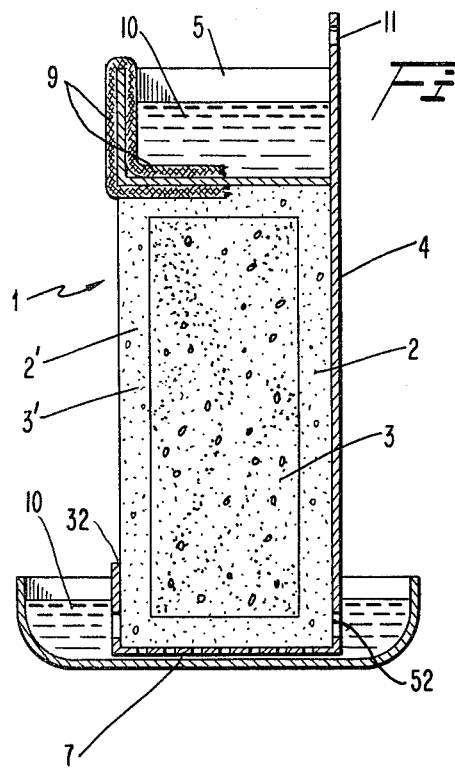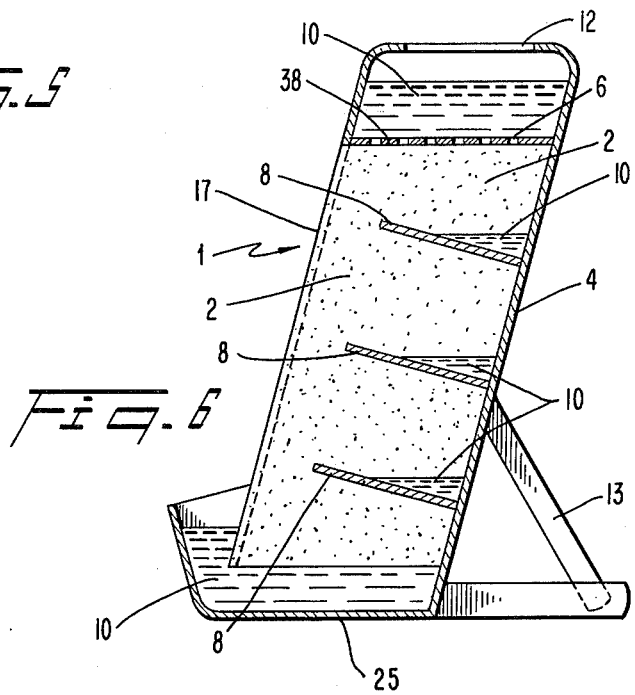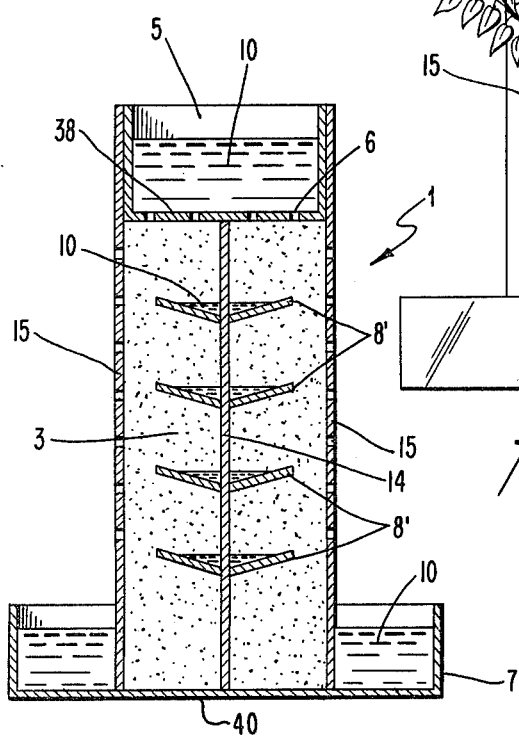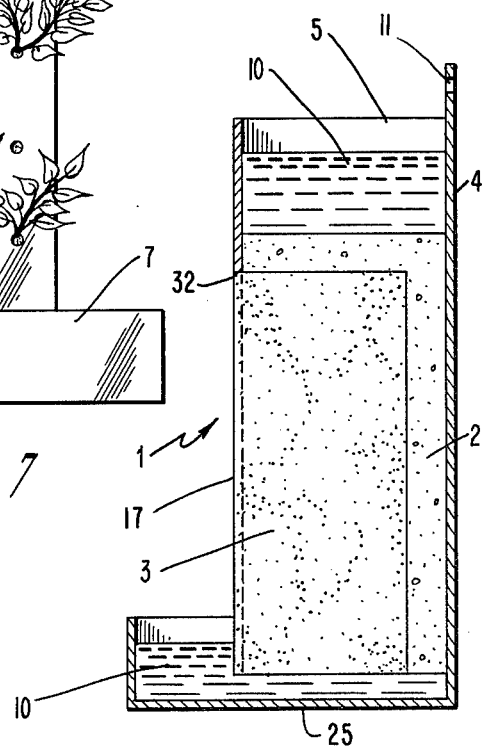

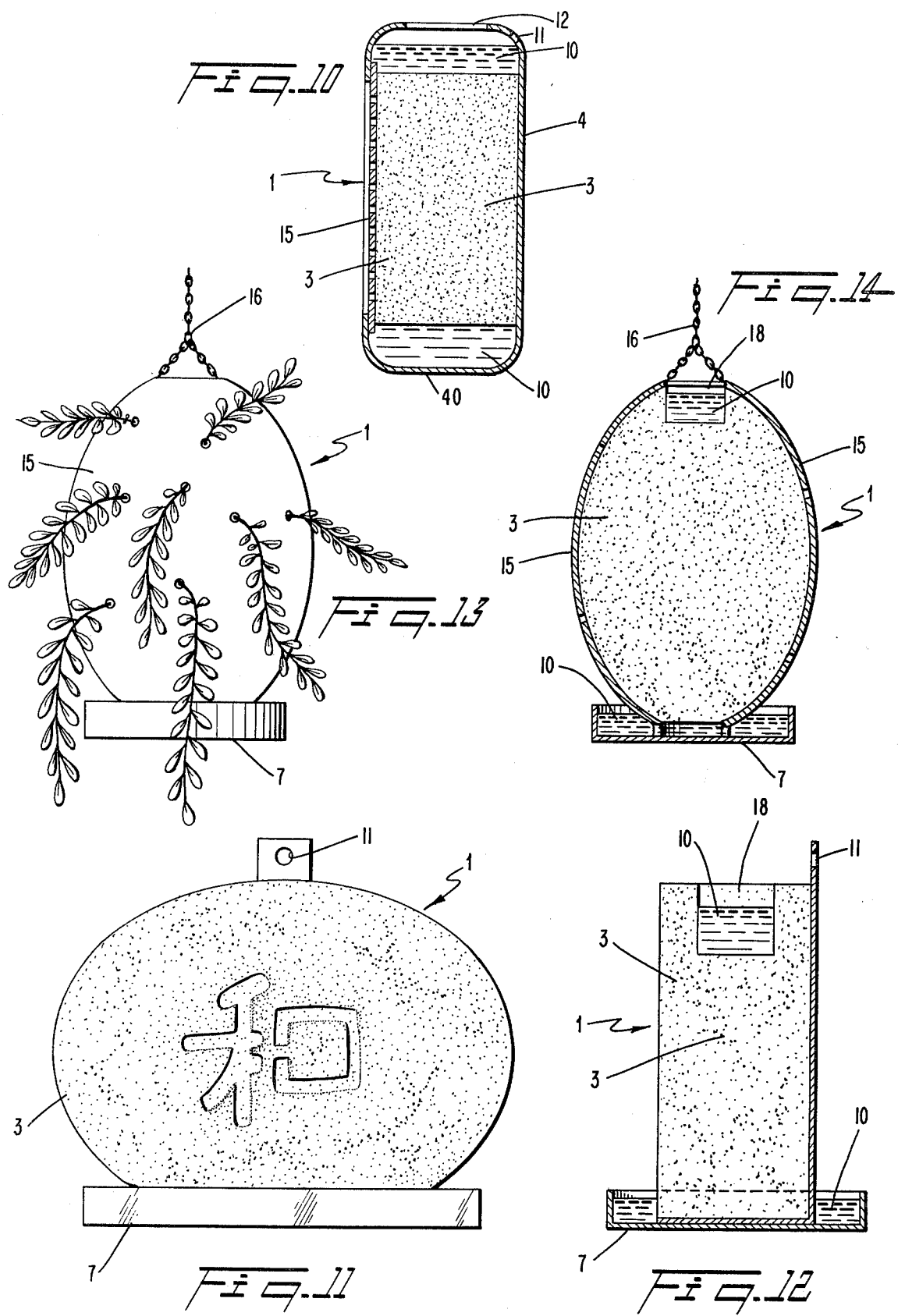

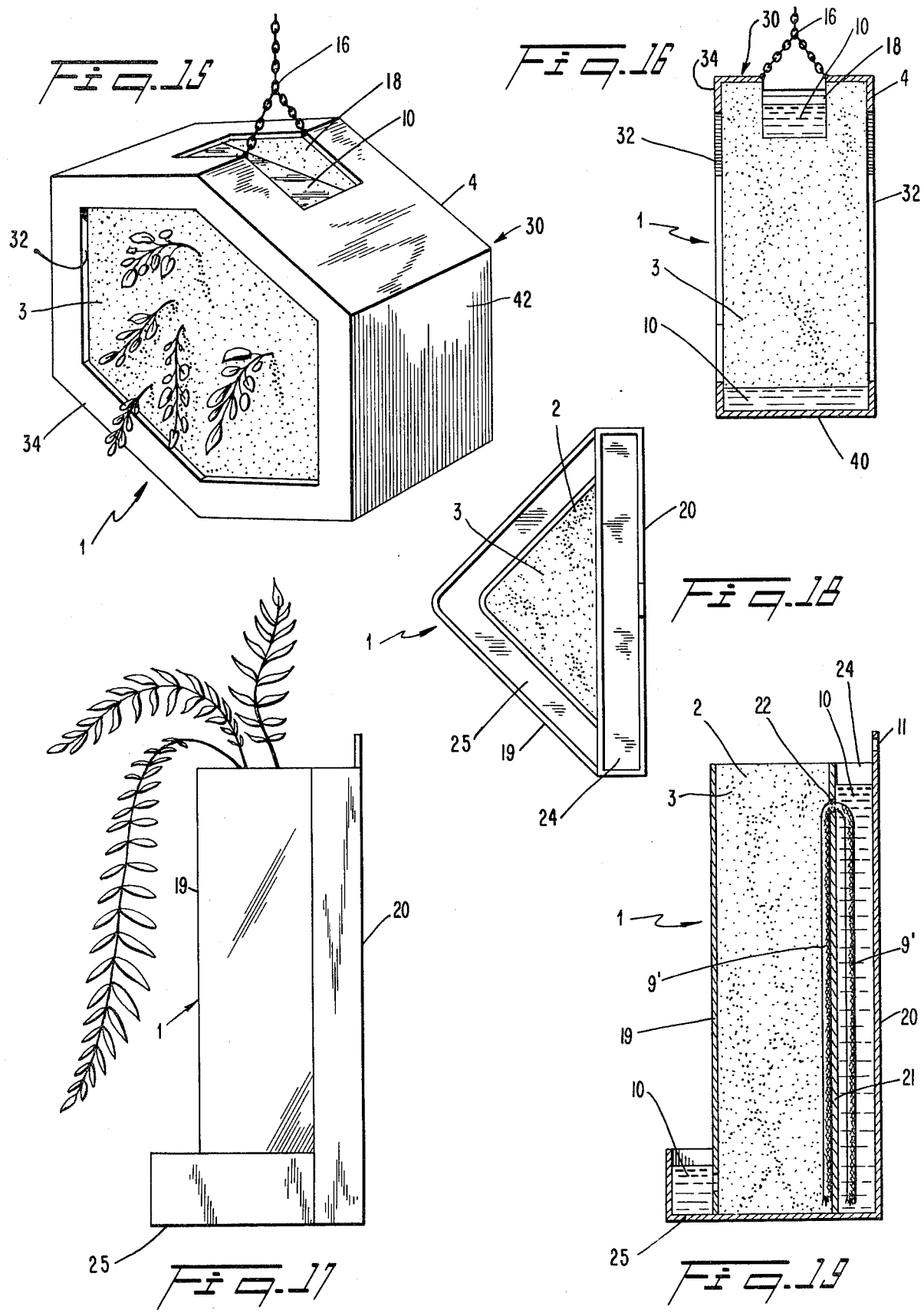

THREE-DIMENSIONAL PLANTER

BACKGROUND OF THE INVENTION

1. Field of the Invention

The invention relates to a three-dimensional planter for growing plants in a vertically-disposed cultivation body. More particularly, the invention is directed to a frame for supporting a vertically-disposed cultivation body, including a reservoir for fluids such as water and a means for metering the transmission of fluids to the cultivation body.

2. Description of the Prior Art

Recently it has become popular to cultivate plants as a part of interior design or as part of environmental improvement programs. Using plants for decoration purposes has required novel means of displaying the plants. Traditionally, plants have been grown in horizontally-disposed cultivation material, the plants growing out of the flat surface of the cultivation material. This means of growing plants requires a significant amount of space and is limited in the decorative effects that may be achieved.

Because of today's modern homes which have limited space and small yards, it is necessary to take advantage of other previously unused space such as walls, poles and fences as places in which plants may be grown. By providing a means for growing plants in such previously unused space, people having small homes and yards may have numerous plants for decoration purposes or to grow vegetables. Furthermore, by providing a means to grow plants in a vertical manner, unusual and novel interior design or unique exterior landscaping in small yards may be achieved.

An additional problem encountered by people in urban settings is obtaining soil in which plants may be properly cultivated. It is possible to grow plants in artificial cultivation material such as a foamed plastic material in combination with soil and other nutrients. A cultivation body made of urethane, for example, is light-weight and provides good ventilation to the roots of plants. However, if vertically disposed, it has disadvantages in that it does not retain moisture and it is difficult to apply fertilizers uniformly.

Additionally, vertically-disposed cultivation material will not hold its shape without proper support. Many known forms of support for vertically-disposed cultivation material have been unsightly and detract from the decoration effect intended. The use of soil overcomes the disadvantage of water retention. However, it is significantly heavier than the artificial cultivation material, and it, too, needs external support if it is vertically disposed.

Accordingly, it is the purpose of the invention to provide a decorative, three-dimensional planter which overcomes the disadvantages of the prior art. It is the object of this invention to provide a frame for supporting the vertically-disposed mixture of soil and artificial cultivation material which includes a reservoir for liquids, such as water and fertilizer, and a means for metering the transmission of the liquid to the cultivation body and providing a uniform distribution of the liquid throughout the cultivation body.

SUMMARY OF THE INVENTION

The three-dimensional planter of the invention comprises a cultivation body, a frame for holding the cultivation body, a liquid reservoir proximate the cultivation body supported by the frame, means for restrictively conducting liquid from the reservoir to the cultivation body, and a liquid collection trough for collecting excess liquid from the cultivation body.

Preferably, the cultivation body includes culture and filler materials which may be irregularly mixed or arranged in alternating horizontal or vertical layers.

The cultivation body may include culture material surrounded on all sides by artificial filler materials.

The cultivation body may also comprise culture and filler materials mixed with an adhesive agent or having the surface sprayed with an adhesive agent for preventing separation of the body.

Preferably, the frame encloses the cultivation body on all sides and has at least one opening through which plants are grown in the cultivation body, a fluid access opening and a fluid drainage opening.

It is preferred that the liquid reservoir be formed by the walls of the frame above the cultivation body, although it may be preferred to have the liquid reservoir formed by the frame on one side of the cultivation body and separated therefrom by a wall.

Preferably, the means for conducting liquid from the reservoir to the cultivation body is a plurality of holes in the wall separating the cultivation body from the reservoir. It may also be preferred that the liquid be conducted by means of pipes interconnecting the reservoir with the cultivation body or by means of wick of permeable material interconnecting the reservoir with the cultivation body transmitting the liquid by capillary action.

The liquid collection trough is preferably the bottom wall of the frame extending around the periphery of the frame and having an upward extending flange at its periphery such that water drained through the drainage holes in the frame collects in the trough.

It may be preferred to include liquid retention boards attached to the frame between the reservoir and the trough and slantingly extending into the cultivation body for retaining liquid in the cultivation body.

The accompanying drawings which are incorporated in and constitute a part of this specification, illustrate one embodiment of the invention and, together with the description, serve to explain the principles of the invention.

BRIEF DESCRIPTION OF THE DRAWINGS

FIG. 1 is a cross-sectional view of an embodiment of the invention.

FIG. 2 is a front view of the embodiment of the invention of FIG. 1.

FIGS. 3, 4, 5 and 6 are vertical cross sections of other embodiments of the invention.

FIG. 7 is a side view of another embodiment of the invention.

FIG. 8 is a cross-sectional view of the embodiment of FIG. 7.

FIGS. 9 and 10 are cross-sectional views of other embodiments of the invention.

FIG. 11 is a front view of another embodiment of the invention.

FIG. 12 is a cross-sectional view of the embodiment of FIG. 11.

FIG. 13 is a front view of another embodiment of the invention.

FIG. 14 is a cross-sectional view of the embodiment of FIG. 13.

FIG. 15 is a perspective view of still another embodiment of the invention.

FIG. 16 is a cross-sectional view of the embodiment FIG. 15.

FIG. 17 is a side view of another embodiment of the invention.

FIG. 18 is a top view of the embodiment of FIG. 17.

FIG. 19 is a cross-sectional view of the embodiment in FIG. 17.

DETAILED DESCRIPTION OF THE EMBODIMENTS OF THE INVENTION

In accordance with the invention, a three-dimensional planter is provided which includes a cultivation body.

Preferably, as seen in FIG. 1, the cultivation body 1 consists of light-weight animal and/or vegetable fillers or plastic material such as foamed urethane and a culture material such as pure soil. The cultivation body 1 provides a growing medium in which plant seeds or plant seedlings or cuttings may be sown or the cultivation body may be used as a secure base for arranging flowers.

The filler material in the cultivation body 1 may be any one or a mixture of plastic foamy matter, or its fine particles or powders; mop mold; palm; a soft artificial material having a plurality of consecutive pores; vegetable textiles, like cotton; artificial textiles; mosses; sponge; sphagnum moss; fern; osmunda; rice hulls; fur; woven cloth; and unwoven cloth. Any one or any combination of these fillers may be used and may be mixed with fertilizers if necessary.

As a culture material in the cultivation body, the following materials may be used singly or in combination: natural black soil; red soil; kanuma soil; leaf mold; clay; various sorts of sand; natural or artificial water-retaining stone; peat moss; silicic soil; vermiculite; Family soil; and other natural or artificial culture or soil. These culture materials may be mixed with fertilizer where necessary.

In one embodiment as depicted in FIG. 3, the culture material 3 is combined with a filler 2 in vertically separated layers. Similarly, as seen in FIG. 4, the culture material and filler may be horizontally separated in vertical layers. The combination of the filler and culture material may also be arranged in irregular spaced blocks or in an irregular mixture. Arrangements of filler, such as in FIG. 4, may be used to assist transmission of fluid throughout the cultivation body.

It may be preferred to use a culture material loosely mixed with a large pore filler. In such case, it is necessary to provide a coating on the cultivation body to prevent its separation. In the embodiment depicted in FIG. 5, a loose mixture of filler 2 and culture material 3 is surrounded by a layer of more closely packed, small pore filler 2' and culture material 3'. The enclosing layer may be a mixture of culture material and foamed urethane which is allowed to set in the layer enclosing the loosely packed cultivation body but permitting transmission of air and water and the planting of seeds or seedlings.

Where, for example, the culture material 3 is loose soil and sand or similar materials, a layer must be used to hold it in a vertically disposed body. Instead of a foamed layer, as discussed above, a layer 15, 17 (FIGS. 6, 8-10) of other material which will hold the culture material together and provide air ventilation and water drainage. The layer 15 may be of textile, net, filament, porous board, silicic soil, clay, peat moss, sphagnum moss or other mosses.

As an alternative, the loose mixture of culture material and filler may be mixed with an adhesive agent to hold the cultivation body together (FIGS. 11 and 12). Additionally, the adhesive agent may be sprayed on the surface of the cultivation body so as to keep it in a single, vertically-disposed body.

The shape and size of the cultivation body and the proportion of filler and cultivation material will depend on the type of plants to be grown and the shape and size of the planter.

In arranging the cultivation body where the culture material is separated in layers either vertically or horizontally, by filler material, if the filler material has different specific gravity or different pore sizes, it is possible to provide more than one type of culture material in the same planter, thus permitting growth of different plants having different requirements.

It may also be desired to use a plastic foam filler of one pore size as an outer layer 17 (FIGS. 6 and 9) to hold the culture material 3 in place and to use the filler 2 having a larger pore size as a layer which may be soaked to provide a means for distribution of liquid throughout the cultivation body.

If the cultivation body is small, the layer 2 of filler material in FIG. 9 may be eliminated as depicted in FIG. 10. Furthermore, the outer layer 17 designed to prevent separation of the cultivating material may be eliminated depending on the plants grown in the material. In some situations, the plants may be sown in the cultivation body while in a horizontal position and after they have become established the cultivation body can be raised to the vertical position.

In accordance with the invention, the three-dimensional planter includes a frame for holding the cultivation body. Preferably, as may be best seen in FIGS. 1, 2, 15 and 16, the frame 30 at least partially encloses the cultivation body 1 on all sides and has at least one opening 32 in at least one side from which the plants are grown in the cultivation body.

The frame may be rigid or flexible. A rigid frame may be manufactured of plastic, wood, metal or porcelain. A flexible frame may consist of a skin produced through painting the outer surface of the cultivation body if the cultivation body is of a plastic foam material. A flexible frame may be reinforced with nets, cloth or a vinyl material. Preferably, as seen in FIG. 2, the frame has means for hanging the planter such as the hole 11 at the top of the frame.

As seen in FIGS. 1, 2, 15 and 26, for example, the frame preferably includes a front wall 34, a back wall 4, top wall 38, bottom wall 40 and two side walls 42 and 44 enclosing the cultivation body. At least one of the vertically disposed front 34, back 4 and side walls 42, 44 has an opening 32 through which the plants 46 are grown in the cultivation body 1. The opening 32 has an area greater than one-half the area of the vertical wall exposing a planting surface in the cultivation body.

It may also be preferred to eliminate the top wall 38 as seen in FIG. 9. Instead of a top wall in FIG. 9, a layer of filler material 2 separates the reservoir 5 from the cultivation body 1.

The frame may preferably take any convenient shape such as a square parallelepiped as seen in FIGS. 1, 2, 4, 5, 7, 8 and 9, an oblique rectangular parallelepiped as seen in FIGS. 3 and 6, an ellipsoid as seen in FIGS. 11 and 13 or a polygonal prism as seen in FIG. 15.

In accordance with the invention, the planter includes a liquid reservoir proximate the cultivation body supported by the frame.

Preferably, as may be seen in FIGS. 1 and 3 through 5, the reservoir 5 is formed by the frame above the cultivation body. The front 34, back 4 and side walls 42, 44 of the frame 30 extend above the cultivation body 1 to form the liquid reservoir 5, and the liquid reservoir 5 is separated from the cultivation body by the top wall 38.

The liquid reservoir 5 may be completely open at the top as seen in FIGS. 1, 3, 4, 5 and 9, or the reservoir 12 may be partially enclosed as in FIGS. 6 and 10. Furthermore, in those frames having unusual shape such as the embodiments of FIGS. 11, 13 and 15, the liquid reservoir 18 may be formed within the top portion of the cultivation body 1.

It may be preferred, particularly where the plants to be grown in the planter must be grown on a horizontal surface, to have the liquid reservoir formed by the frame on one side of the cultivation body and separated therefrom by a wall. In the embodiment of FIGS. 17-19, the reservoir 28 is located between the back wall 20 and separated from the cultivation body 1 by separation wall 21 located between the back wall 20 and front wall 19 and substantially parallel thereto.

In accordance with the invention, the planter includes means for restrictively conducting liquid from the reservoir to the cultivation body.

It is preferred that the means for conducting liquid from the reservoir to the cultivation body be a plurality of holes 6 in the top wall 38 which separates the reservoir 5, 12 from the cultivation body 1 as seen in FIGS. 1, 3, 6 and 8. Water 10 or fertilizer dissolved in water contained in the liquid reservoir 5, 12 passes through the plurality of holes 6 to the cultivation body 1. The top wall 38 or water supply board may be made of plaster, clay and glazed porcelain, of metal, plastic or wood into which small holes 6 have been bored. The dimension of the holes 6 will determine the rate at which the liquid 10 in the liquid reservoir 5, 12 passes to the cultivation body 1.

If the cultivation body 1 is capable of retaining water, there may be no need for a means for metering the flow of fluid such as depicted in FIG. 10.

The means for conducting fluid from the liquid reservoir 5 may also be pipes which interconnect the liquid reservoir 5 to the cultivation body 1. The pipes may be useful where the planter is very large not only for conducting water to all portions of the cultivation body, but also where the pipes run along one wall of the frame for reinforcing the frame and cultivation body.

Preferably, the liquid-conducting means may be a wick 9, 9' of permeable material interconnecting the liquid reservoir 5, 24 with the cultivation body 1 for transmitting liquid by capillary action. As embodied and depicted in FIGS. 4, 5 and 19, water transmission materials 9, 9' of high permeability, such as cloth, thread, string, paper, or urethane are placed in the liquid reservoir 5, 24 and extend to the cultivation body 1. By capillary action, the siphon effect of the wick 9, 9' conducts water or liquid from the liquid reservoir 5, 24 to the filler 2 and culture material 3. The amount of liquid being transmitted to the cultivation body 1 depends on the shape, size and type of wick 9, 9', and, by varying these parameters, it is possible to control the rate at which liquid is transmitted from the reservoir 5, 24 to the cultivation body 1.

Wick material may also be used to supply water to the cultivation body when liquid in the reservoir has run out. Since filler 2 acts as a wick material, it may be used to conduct water from the liquid collection trough 7, 25 after water has run out of the liquid reservoir 5. This may be seen, for example, in FIGS. 3, 4, 5, and 9 where the columns of filler 2 extend into the reservoir 7, 25 and, by capillary action, cause the liquid collected there to be transmitted to the cultivation body 1.

Filler of high liquid retention capacity may also be used as a means for transmitting liquid to all portions of the cultivation body. For example, as may be seen in FIG. 3, liquid from the reservoir 5 passes through the top wall 38 soaking the filler material 2. The liquid may then soak the different layers of filler 2 providing uniform distribution of liquid in the cultivation body 1. This is particularly useful where the culture material is of a type such as clay, which does not drain properly or a material that does not retain water.

Similarly, in FIG. 9, the filler 2 is of a textile material having good water retention properties which interconnects the liquid reservoir 5 and the liquid collection trough 25. Liquid 10 in the reservoir 5 and liquid 10 in the liquid collection trough 25 may be supplied to the cultivation body 1 by means of the textile filler 2.

Another embodiment of the means for conducting fluid from the fluid reservoir to the cultivation body is depicted in FIG. 19 where the liquid reservoir 24 is separated from the cultivation body 1 by a board 21. The means for conducting the fluid is a wick 9' extending through an opening 22 in the board 21 interconnecting the fluid in the reservoir 24 with the cultivation body 1.

In accordance with the invention, the three-dimensional planter includes a liquid collection trough attached to the frame for collection of excess liquid from the cultivation body. Preferably, as depicted in FIGS. 1, 2, 4, 5 and 8, the trough 7 is attached to and extends around the periphery of the bottom of the frame 30. The liquid collection trough 7 may be formed from a peripheral extension of the bottom wall 40 having upwardly extending flanges 50 around its periphery. The liquid passing from the cultivation body 1 passes through an opening 52 in one of the front 34, back 4 or side walls 42, 44 proximate the bottom wall 40 into the trough 7.

As seen in FIGS. 3, 9 and 19, the trough 25 may only extend to the front side of the planter. It is particularly true where the planter is to be mounted on a wall or post.

It is preferred that the planter also include a liquid retention board 8 attached to the frame between the reservoir 512 and the trough 7, 25 and slantingly extending into the cultivation body 1 for retaining liquid in the cultivation body 1. As seen in FIGS. 1 and 6, liquid retention boards 8 are attached to the back wall 4 and extend slantingly upward into the cultivation body 1. The liquid retention boards 8 accumulate liquid 10 to prevent rapid transmission of liquid 10 through the cultivation body 1.

In another embodiment depicted in FIG. 8, the planter includes a central wall 14 extending substantially parallel to layers 15 and between the top and bottom walls 38, 40 substantially dividing the cultivation body 1 and including a plurality of vertically spaced liquid retention boards 8 attached to the center wall 14 between the top and bottom walls 38 and 40 and slantingly extending from each side of the central wall 14 into the cultivation body 1 for retaining liquid 10 in the cultivation body 1. These liquid-retaining boards 88' are particularly useful where the cultivation material has low water retention capability, for example, where it is composed primarily of sand or filler having no water retention ability.

It will be apparent to those skilled in the art that various modifications and variations can be made in the three-dimensional planter of the present invention without departing from the scope or spirit of the invention. The invention provides a three-dimensional decorative planter having the functions of water soaking, water servicing, water retention, air-ventilation, water drainage, and secure support for the cultivation material. It is intended that the present invention cover the modifications and variations of this invention provided they come within the scope of the appended claims and their equivalents.

What is claimed is:

1. A three-dimensional planter, comprising:
   (a) a cultivation body;
   (b) a vertically disposed frame for holding said cultivation body, at least one vertical wall of said frame having a substantially unobstructed opening providing a vertically disposed planting surface on said cultivation body, the area of said opening being greater than one-half the area of said one vertical wall;
   (c) a liquid reservoir formed by said frame above and proximate said cultivation body;
   (d) means for restrictively conducting liquid from said reservoir to said cultivation body;
   (e) means for retention and distribution of liquid within said cultivation body; and
   (f) a liquid collection trough secured to the bottom of said frame for collecting excess liquid from said cultivation body.

2. The planter of claim 1 wherein said cultivation body includes culture merterial and filler material.

3. The planter of claim 2 wherein said culture material and filler material are arranged in horizontal, alternating layers forming said cultivation body.

4. The planter of claim 2 wherein said culture material and filler material are arranged in vertical, alternating layers forming said cultivation body.

5. The planter of claim 2 wherein said culture material is surrounded by a layer of said filler material forming said cultivation body.

6. The planter of any one of claims 3, 4, or 5 wherein said planting surface is covered by a layer of said filler material.

7. The planter of claim 2 wherein said culture material and filler material are irregularly mixed forming said cultivation body.

8. The planter of claim 2 wherein said filler material is selected from the group consisting of particulate plastic foam, vegetable textiles, artificial textile, moss, sponge, sphagnum moss, fern, rice hulls, fur, woven cloth, unwoven cloth, palm and mixtures thereof.

9. The planter of claim 2 wherein said filler is foamed urethane.

10. The planter of claim 2 wherein said culture material is selected from the group consisting of natural black soil, red soil, kanuma soil, leaf mold, clay, sand, natural or artificial water-retaining stone, peat moss, silicic soil, vermiculite, family soil and mixtures thereof.

11. The planter of claim 1 wherein said cultivation body comprises culture material mixed with adhesive agents for preventing separation of the culture material.

12. The planter of claim 1 wherein said cultivation body comprises a body of culture material the surface of which is sprayed with adhesive agent for preventing separation of the culture material.

13. The planter of claim 1 wherein said frame is rigid.

14. The planter of claim 1 wherein said frame is flexible.

15. The planter of claim 1 wherein said frame has substantially vertically disposed front, back, and two side walls and substantially horizontally disposed top and bottom walls enclosing said cultivation body, at least one of said front, back and side walls having said opening through which plants may grow in the planting surface of said cultivation body.

16. The planter of claim 15 wherein said front, back and side walls extend above said cultivation body to form said liquid reservoir, said liquid reservoir being separated from said cultivation body by said top wall.

17. The planter of claim 16 wherein said liquid conducting means is a plurality of holes in said top wall.

18. The planter of claim 15 wherein said through is said bottom wall extended beyond said front, back and side walls and having an upward-extending flange at its periphery and wherein one or more holes in said front, back and side walls proximate said bottom wall permit drainage from said cultivation body to collect in said trough.

19. The planter of claim 15 wherein said trough is between said bottom wall and the bottom of said cultivation body.

20. The planter of claim 15 also including a plurality of spaced liquid retention boards attached to the back wall of said frame between said top and bottom walls and slantingly extending into said cultivation body for retaining liquid in said cultivation body.

21. The planter of claim 15 also including a central wall extending substantially parallel to said front and back walls and between said top and bottom walls substantially dividing said cultivation body and including a plurality of spaced liquid retention boards attached to said central wall between said top and bottom walls and slantingly extending from each side of said central wall into said cultivation body for retaining liquid in said cultivation body.

22. The planter of claim 1 wherein said frame is an ellipsoid.

23. The planter of claim 1 wherein said frame is a polygonal prism.

24. The planter of claim 1 wherein said liquid conducting means is a wick of permeable material interconnecting said liquid reservoir and said cultivation body for transmitting liquid by capillary action.

25. The planter as in claim 1 wherein said liquid retention and distribution means comprises horizontal and vertical interconnected layers of said filler material arranged within said cultivation body and in fluid communication with said liquid in said reservoir.

26. The planter as in claim 1 wherein said liquid retention and distribution means is a plurality of vertically spaced boards secured to said frame between said reservoir and said trough and slantingly extending into said cultivation body for retaining liquid at a plurality of vertically spaced locations within said cultivation body.

27. The planter as in claim 1 wherein said conducting means is vertically and horizontally arranged interconnected layers of filler material.

* * * * *